United States Patent

Numazawa et al.

[15] 3,645,366
[45] Feb. 29, 1972

[54] ENGINE SPEED AND CLUTCH SYNCHRONIZING CONTROLS INCLUDING TRANSMISSION CONTROLS

[72] Inventors: Akio Numazawa, Toyota; Osamu Ito, Yoyota, both of Japan

[73] Assignee: Nippondenso Kabushiki Kaisha, Aichiken, Japan

[22] Filed: June 1, 1970

[21] Appl. No.: 42,425

[30] Foreign Application Priority Data

June 3, 1969 Japan....................................44/43885

[52] U.S. Cl..............................192/.08, 192/.092, 74/860, 74/872, 123/102, 192/3.56, 317/148.5
[51] Int. Cl..........................................................B60k 21/00
[58] Field of Search....................192/.08, .092, .062, .08, .09

[56] References Cited

UNITED STATES PATENTS

| 3,335,830 | 8/1967 | Castelet | 192/.092 |
| 2,952,346 | 9/1960 | Costa et al. | 192/.092 |
| 3,349,878 | 10/1967 | Castelet | 192/.092 |

Primary Examiner—Benjamin W. Wyche
Attorney—Cushman, Darby & Cushman

[57] ABSTRACT

An electronic control system for a clutch located between an engine and a variable ratio transmission includes means to detect the speeds of the input and output clutch shafts, and to control the engine speed before and during gear shifts so that the clutch will engage at synchronous clutch shaft speeds. A special preshift predictive computer means is used in combination with special digital logic circuitry to insure reliable and optimum operation.

10 Claims, 22 Drawing Figures

INVENTORS
AKIO NUMAZAWA
OSAMU ITO
BY Cushman, Darby & Cushman
ATTORNEYS

INVENTORS
AKIO NUMAZAWA
OSAMU ITO
BY Cushman, Darby & Cushman
ATTORNEYS

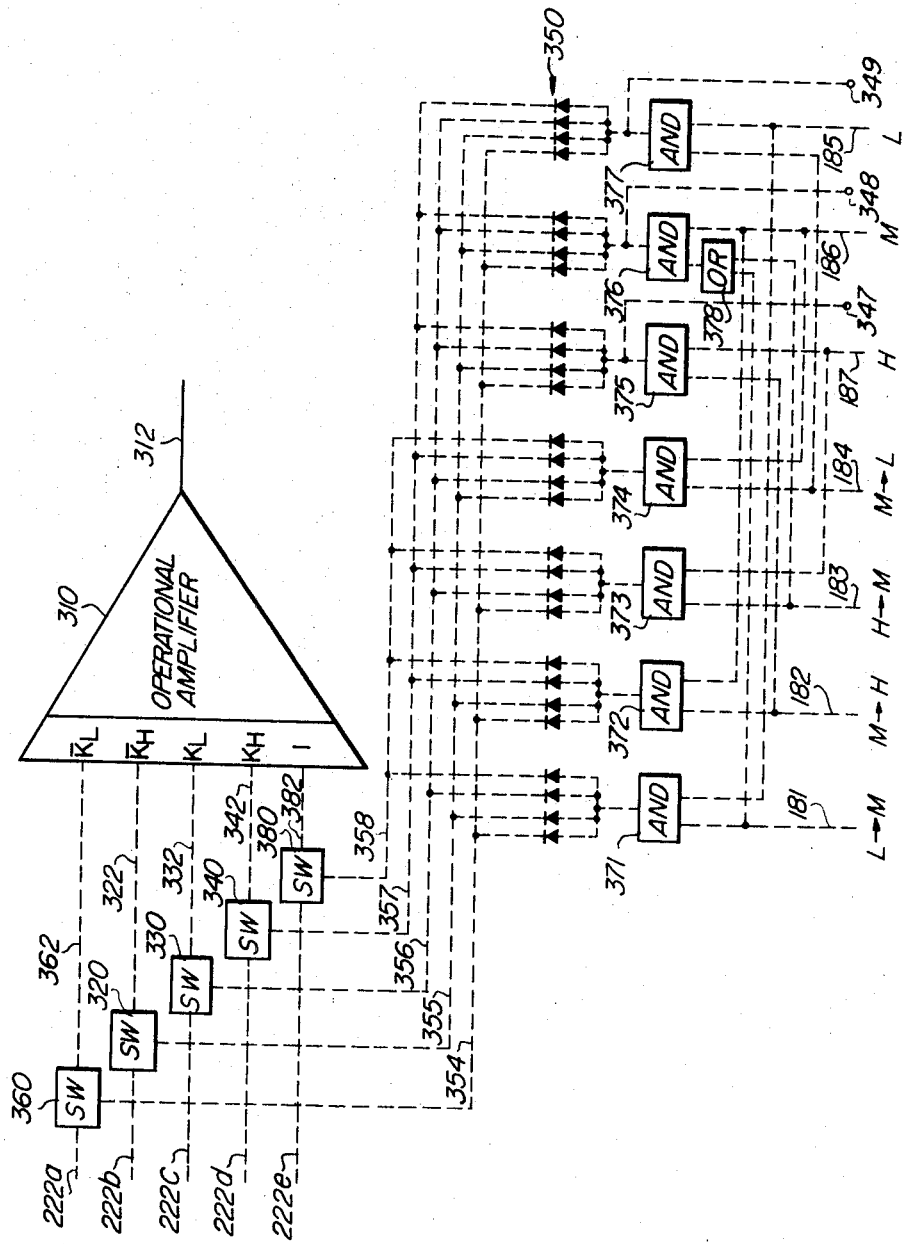

ENGINE SPEED AND CLUTCH SYNCHRONIZING CONTROLS INCLUDING TRANSMISSION CONTROLS

BACKGROUND TO THE INVENTION

1. Field of the Invention

This invention relates to a clutch control system for automatically and smoothly engaging and disengaging a clutch for vehicles having an engine mechanically coupled to its load through a clutch and gear shift transmission mechanism.

2. Description of the Prior Art

In a conventional drive unit composed of an internal combustion engine, a clutch and a multispeed gear transmission adapted especially for mounting on vehicles, a shift in the gear position or meshing condition of the transmission causes an abrupt variation in the rotational speed of the output shaft of the transmission resulting in an excessive variation in the torque of the output shaft. The clutch is generally engaged gradually in order to eliminate such torque variation. However, even with such gradual engagement of the clutch, it is difficult to carry out the clutch engagement without causing any torque variation at the output shaft of the transmission over a wide range of the output torque and the number of revolutions of the engine as well as a wide range of the torque and the number of revolutions of the load. Especially, in an automatic transmission system employing a band-type jaw clutch, it is very difficult to engage the clutch without any torque variation and the clutch tends to be subject to excessive wear. In such a case, the number of revolutions of the engine is reduced to reduce the torque output of the engine and the clutch is engaged in this state. However, in this case too, the number of revolutions of the engine is excessively reduced to an extent that a braking torque is imparted to the output shaft of the transmission thereby frequently developing an undesirable torque variation at the output shaft of the transmission.

SUMMARY OF THE INVENTION

It is therefore an object of the present invention to provide a clutch control system in which means are provided to detect the numbers of revolutions of the input and output shafts of the clutch and to engage the clutch at substantially the same number of revolutions of the input and output shafts so that the engagement of the clutch can be carried out without any difference between the torque on the side of the engine and the torque on the side of the load. To this end, the clutch control system includes means for adjusting the amount of the fuel-air mixture thereby controlling the number of revolutions of the engine when the clutch is in the disengaged position and restoring the amount of the fuel-air mixture to the original state immediately after the clutch is engaged so that the engine develops the same output as that developed before the disengagement of the clutch.

Immediately after the clutch is disengaged, the same meshing engagement of the gears as that existed before is maintained in the transmission, but a shift in the gear position of the transmission after a while establishes new meshing engagement of the gears resulting in an abrupt increase or decrease in the number of revolutions of the output shaft of the clutch. However, controlling the number of revolutions of the engine after the establishment of the new meshing engagement of the gears thereby to equalize the numbers of revolutions of the input and output shafts of the clutch consumes an extra period of time in addition to the period of time required for shifting the transmission. That is to say, an undesirably long period of time is required until the clutch in the disengaged position is engaged again.

It is therefore another object of the present invention to provide a clutch control system in which means are provided to predict new meshing engagement of the gears so soon as the clutch is disengaged and to control the number of revolutions of the engine so that the input and output shafts of the clutch can rotate at the same number of revolutions as soon as the new meshing engagement of the gears is established from the previous state of meshing engagement and the clutch can be engaged immediately after the completion of the new meshing engagement.

According to the present invention, the following advantages can be obtained:

1. A smooth shift free from any torque variation can be attained because the engine is controlled before the engagement of the clutch during the gear shifting so that the input and output shafts of the clutch can rotate at the same number of revolutions. Further, the clutch need not be gradually engaged but can be engaged quite quickly. Thus, the structure of the clutch can be simplified and the clutch can operate stably without any malfunctioning.

Further, means are provided for controlling the engine in such a manner as to increase or decrease the number of revolutions of the engine independently of the actuation of the accelerator pedal. By these means, the clutch can be engaged when the number of revolutions of the clutch input shaft becomes substantially equal to the number of revolutions of the clutch output shaft. At the time of engagement of the clutch, any discontinuous acceleration or deceleration does not occur due to the fact that the throttle valve is kept in the state in which it existed before the speed was changed.

2. A predictive computer circuit which predicts, at the time of disengagement of the clutch, the number of revolutions of the clutch output shaft that will be developed after the establishment of the new meshing engagement of the gears in the transmission is used for controlling the number of revolutions of the engine so as to limit the variation in the number of revolutions of the engine to a minimum. Therefore, noise of and damage to the engine can be reduced.

BRIEF DESCRIPTION OF THE DRAWINGS

FIG. 21 is a block diagram of a predictive computer circuit in the computing circuit shown in FIG. 20 for predicting the number of revolutions of the output shaft of the clutch.

DESCRIPTION OF THE PREFERRED EMBODIMENTS

Figure 1:
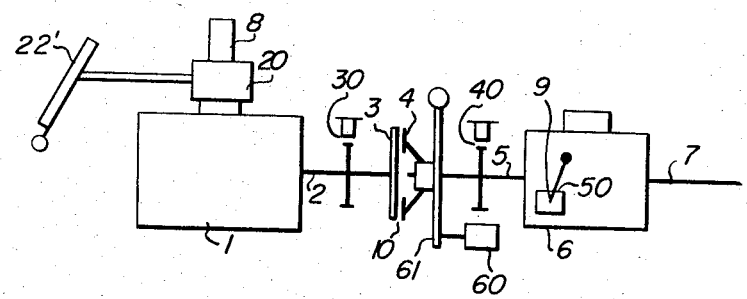
FIG. 1 is a schematic view showing the structure of a drive unit composed of an internal combustion engine, a clutch controlled by a clutch control system according to the present invention, and a multispeed gear transmission.

Referring to FIG. 1, an input shaft 2 of a clutch 10 is connected to an internal combustion engine 1 of a vehicle. A clutch shoe 4 engageable with a clutch disc 3 of the clutch 10 is connected to an output shaft 5 of the clutch 10. The output shaft 5 of the clutch 10 is an input shaft of a gear transmission 6. An output shaft 7 of the transmission 6 is connected to wheels (not shown) to drive the vehicle. A fuel-air mixture controller 20 is mounted in a fuel-air mixture intake port 8 of the engine 1 so that it acts as a means for increasing and decreasing the number of revolutions of the engine 1 independently of the actuation of an accelerator pedal 22'. In other words, the fuel-air mixture controller 20 controls the amount of the fuel-air mixture during a shift in the gear position and is independent of the normal control on the throttle valve by the accelerator pedal 22'. A revolution detector or first speed detector means 30 is associated with the input shaft 2 of the clutch 10, while a revolution detector or second speed detector means 40 is associated with the output shaft 5 of the clutch 10. A shift lever 9 for the transmission 6 is associated with a gear position signal generator 50 responsive to the position of the shift lever 9 so that the gear position signal generator 50 generates a signal representative of the position of the meshing engagement of the gears in the transmission 6. The clutch 10 is engaged and disengaged by means of a clutch solenoid 60 connected to a clutch arm 61. While the clutch 10 shown in FIG. 1 is a friction clutch, the system according to the present invention is equally effectively applicable to any other form of clutch, such as a jaw clutch. The clutch solenoid or clutch actuating/deactuating means 60 acts to engage and disengage the clutch 10 in response to an electrical signal and is a conventional one. A clutch-actuating means including a pneumatic valve or hydraulic valve may be interposed between the clutch solenoid 60 and the clutch 10.

Figure 2A:
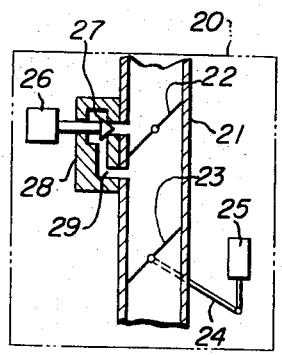
FIGS. 2a and 2b are schematic views showing the structure of a fuel-air mixture controller employed in the clutch control system of the present invention.
Figure 2B:
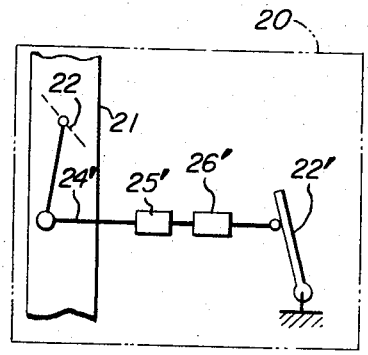

One form of the fuel-air mixture controller or air-fuel mixture controlling means 20 for controlling the fuel-air mixture supplied to the engine 1 is shown in FIGS. 2a and 2b. Referring to FIG. 2a, a commonly known throttle valve 22 is disposed in an intake manifold 21 for controlling the amount of the fuel-air mixture by means of accelerator pedal 22'. A shut-off valve 23 having a structure and function similar to the throttle valve 22 is further disposed in the intake manifold 21 and is connected by a link 24 to a shutoff solenoid 25. When current is supplied to the shutoff solenoid 25, the shutoff valve 23 is actuated by the shutoff solenoid 25 directly or indirectly through pneumatic or hydraulic means to shutoff the flow of the fuel-air mixture through the intake manifold 21. In the intake manifold 21, there is provided an air valve 28 having a passage 29 so that the fuel-air mixture can bypass the throttle valve 22 in the closed position of the throttle valve 22. The air valve 28 includes a valve member 27 which is urged to its open position in response to energization of an opening solenoid 26 so that the fuel-air mixture can flow through the passage 29 bypassing the throttle valve 22. The amount of the fuel-air mixture that can be passed through the passage 29 may be substantially equal to that which the engine consumes so as to rotate at the maximum normal revolutions under no load and is thus relatively small. Referring to FIG. 2b which shows another form of the fuel-air mixture controller 20, the throttle valve 22 is connected through a link 24', a shutoff means 25' and an opening means 26' to the accelerator pedal 22'. Normally, the throttle valve 22 is directly actuated by the accelerator pedal 22'. The shutoff means 25' includes a solenoid therein so that the link 24' can be retracted from its normal position in response to energization of the solenoid and restored to its normal position in response to deenergization of the solenoid. Similarly, the opening means 26' includes a solenoid therein so that the link 24' can be extended from the normal position in response to energization of the solenoid and restored to its normal position in response to deenergization of the solenoid. Although the detailed structure of the shutoff means 25' and the opening means 26' are not illustrated in FIG. 2b, they may be any conventional means known in the art in which the link 24' is directly retracted or extended in response to energization of a solenoid or indirectly retracted or extended through a pneumatic or hydraulic valve.

It will be seen from the above description that the amount of the fuel-air mixture supplied to the engine 1 is increased in response to the energization of the opening solenoid 26'. This is especially effective when the throttle valve 22 is in its closed position. The fuel-air mixture supplied to the engine 1 is shut off in response to the energization of the shutoff solenoid 25'. In response to the deenergization of these solenoids 25' and 26', the original state is restored and the engine 1 develops torque similar to that developed before the energization of the solenoids 25' and 26'.

Figure 3:
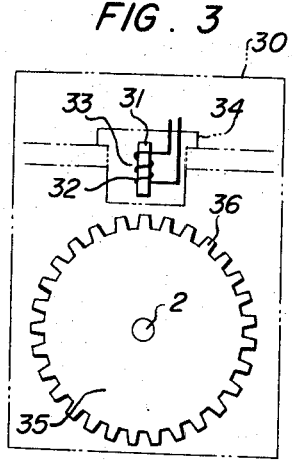
FIG. 3 is a schematic view showing the structure of a revolution detector employed in the clutch control system of the present invention.

The revolution detector 30 has a structure as shown in FIG. 3. The revolution detector 30 is composed of a pickup 33 and a toothed disc 35. The pickup 33 includes a magnet 31 and a coil 32 wound around the magnet 31. As the toothed portion of the toothed disc 35 rotates, a change occurs in the leakage flux of the magnet 31 disposed opposite to the toothed disc 35 to produce an electromotive force in the coil 32. The coil 32 and the magnet 31 are housed in a casing 34 which is fixed to the engine 1 or clutch housing. The toothed disc 35 is connected to the input shaft 2 of the clutch 10 and has a multiplicity of teeth 36. Accordingly, one rotation of the input shaft 2 of the clutch 10 produces across the coil 32 a signal having a frequency corresponding to the number of the teeth 36 of the toothed disc 35. The revolution detector 40 has a structure which is entirely the same as the revolution detector 30 above described. However, the revolution detectors 30 and 40 need not necessarily have a structure as described and may be a conventional one which produces an electrical signal proportional to the number of revolutions of the associated shaft. (This electrical signal may be a pulse signal or an analog signal such as a voltage.)

Figure 4:
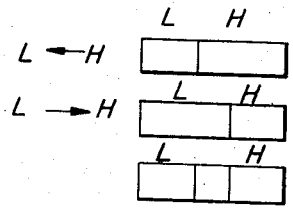
FIG. 4 is a diagram showing how a gear position signal is generated by a gear position signal generator in the clutch control system of the present invention.

The gear position signal generator 50 is disposed at the base portion of the shift lever 9 and may be a switch which is actuated in response to the movement of the shift lever 9. The gear position signal generator 50 is commonly in the form of a single-pole two-contact snap switch. The operation of the gear position signal generator 50 will be described with reference to FIG. 4. The symbols L and H at the lowermost part of FIG.

4 designate the range in which the gears in the transmission are in the low gear position, and the range in which the gears are in the high gear position, respectively. The portion intermediate between the L and H portions designates the range in which the gears are in an neutral state during a shift between low and high gear. The gear position signal generator 50 is operative so that, when a shift from low to high gear occurs in the transmission as shown by the arrow L → H, a low gear position signal L is generated in the area designated by L in the middle part of FIG. 4 and a high gear position signal H is generated in the range designated by H, while when a shift from high to low gear occurs in the transmission as shown by the arrow H → L, the high gear position signal H is generated in the area designated by H in the uppermost part of FIG. 4 and the low gear position signal L is generated in the range designated by L. Thus, there is hysteresis between the shift from low to high gear and the shift from high to low gear. In other words, the gear position signal generator 50 may be such that, during a shift from low to high speed, the low gear position signal L is switched over to the high gear position signal H as soon as the meshing engagement of the gears giving the high gear position takes place, while during a shift from high to low speed, the high gear position signal H is switched over to the low gear position signal L as soon as the meshing engagement of the gears giving the low gear position takes place. In the case of an automatic transmission, a shift signal effecting a shift is derived from means which determines the shifting timing on the basis of signals representative of the vehicle speed, throttle position and so on. Further, in shifting the automatic transmission manually, the shift signal is derived from means responsive to the manipulation of the shift control lever.

Figure 5:
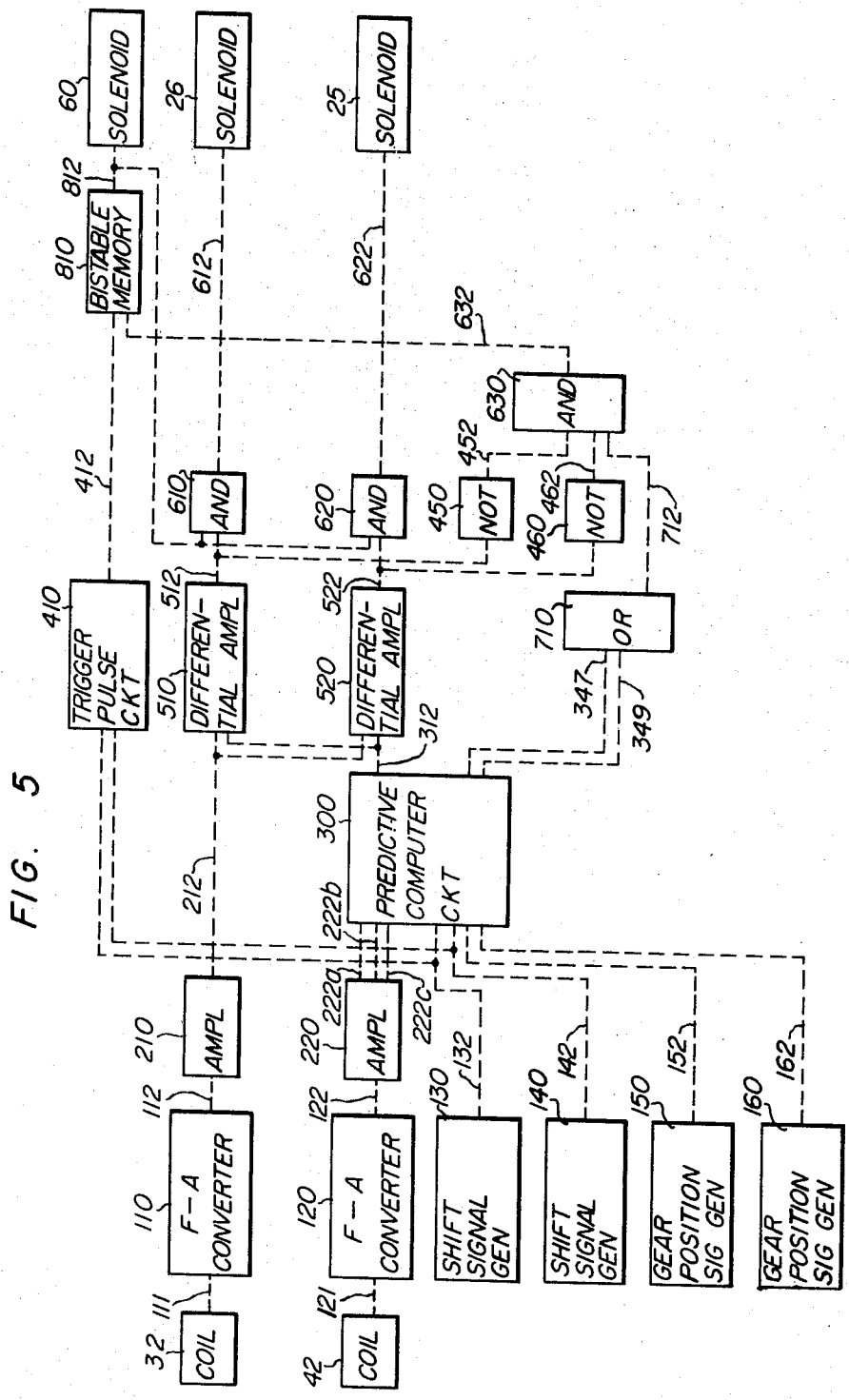
FIG. 5 is a block diagram of a computing circuit when the present invention is applied to a two-forward speed transmission.

FIG. 5 is a block diagram of a computing circuit when the present invention is applied to a two-forward speed transmission. Unless especially specified, the term "signal" used hereunder denotes a positive voltage signal.

The computing circuit includes F-A converters (frequency—DC voltage converters) 110 and 120 to which the signals (that is, AC voltages at frequencies proportional to the numbers of revolutions of the input shaft 2 and output shaft 5 of the clutch 10) induced across the coils 32 and 42 of the revolution detectors 30 and 40 are applied through leads 111 and 121, respectively. Output signals from the F-A converters 110 and 120 appear on respective output leads 112 and 122. The F-A converters 110 and 120 are each composed of an input signal amplifier, a wave-shaping circuit such as a Schmitt circuit, and a rectifier and produces an output signal in the form of a DC voltage proportional to the input frequency. If the revolution detectors 30 and 40 are a DC generator which generates an analog signal proportional to the number of revolutions of the associated shaft, the analog signal outputs from the detectors 30 and 40 are directly applied to amplifiers 210 and 220 by the leads 111 and 121, respectively. The input signal applied to the amplifier 210 from the F-A converter 110 through the lead 112 is amplified thereby and an output signal appears on a lead 212, while the input signal applied to the amplifier 220 from the F- A converter 120 through the lead 122 is amplified thereby and an output signal appears on leads 222a, 222b and 222c. The amplifier 220 is a conventional one well known in the art except that its last stage is designed to deliver a plurality of outputs of the same magnitude the number of which is equal to (2n−1) where n is the number of shiftable stages of the transmission. The amplifier 220 is so constructed that, even when any one of the output signals appearing on the leads 222a, 222b and 222c may grounded, the remaining output signals can be delivered without any interference. The amplifier 210 has the same amplification factor as the amplifier 220 but its last stage includes only one output.

Differential amplifiers 510 and 520 are ones which are generally called an operational amplifier and act to amplify the difference between two input signals applied through leads 212 and 312, and output signals appear on respective leads 512 and 522. The differential amplifier 510 delivers an output signal to the lead 512 when the input signal applied through the lead 312 is greater than the input signal applied through the lead 212, while the other differential amplifier 520 delivers an output signal to the lead 522 when the input signal applied through the lead 212 is greater than the input signal applied through the lead 312.

AND-circuits 610, 620 and 630 are conventional ones well known in the art and produce an output signal only when all the input signals are applied thereto. The input signals are applied to these AND-circuits 610, 620 and 630 through leads 812, 512, leads 812, 522, and leads 452, 462, 712, and the output signals appear on leads 612, 622 and 632, respectively.

The OR-circuit 710 is also a conventional one well known in the art and produces an output signal when any one of the input signals is applied thereto. The input signals are applied to the OR-circuit 710 through leads 347 and 349 and the output signal appears on the lead 712.

NOT-circuits 450 and 460 are also conventional ones well known in the art and are phase reversion circuits. The NOT-circuits 450 and 460 do not produce an output signal when an input signal is applied thereto, but produce an output signal when no input signal is applied thereto. The input signals are applied to the NOT-circuits 450 and 460 through the leads 512 and 522, and the output signals appear on the leads 452 and 462, respectively. A trigger pulse circuit 410 produces an output signal in the form of a positive pulse signal of a predetermined pulse width in response to the application of any one of the input signals, and the output signal disappears thereafter. The input signals are applied to the trigger pulse circuit 410 through leads 132 and 142, and the output signal appears on a lead 412 in response to the application of any one of these input signals. The trigger pulse circuit 410 is actually a differentiator.

A bistable memory circuit 810 is urged to one of two stable states when one of two input signals is applied thereto through the lead 412, and an output signal appears on the lead 812 and is kept supplied to the solenoid 60. On the other hand, the bistable memory circuit 810 is urged to the other stable state when the other input signal is applied thereto through the lead 632, and the output signal having appeared on the lead 812 disappears and this state persists until the input signal is applied through the lead 412 again. The bistable memory circuit 810 is one which is commonly called a bistable multivibrator and operates stably without any malfunctioning due to noise.

Shift signal generators 130 and 140 supply the shift signals to the predictive computer circuit 300 through the leads 132 and 142, respectively. These shift signal generators 130 and 140 generate the shift signals when the need arises to shift to high gear and to low gear, respectively. The shift signal generators 130 and 140 may, for example, be a switch responsive to the shift lever 9 or a signal generator which generates a signal depending on the load and the number of revolutions of the engine. A low gear position signal generator 150 and a high gear position signal generator 160 generate a low gear position signal L and a high gear position signal H, respectively, as described previously. The low gear position signal generator 150 which may simply be a switch supplies the output signal or low gear position signal L to the predictive computer circuit 300 through a lead 152, while the high gear position signal generator 160 which may also simply be a switch supplies the output signal or high gear position signal H to the predictive computer circuit 300 through a lead 162.

The predictive computer circuit 300 operates, in response to the shift signal supplied from the shift signal generator 130 or 140 predicts a shift to a new gear position after the disengagement of the clutch 10 and produces a signal corresponding to the number of revolutions of the clutch output shaft 5 at which it will rotate after the establishment of the new meshing engagement of the gears. Thus, the predictive computer circuit 300 already generates a signal corresponding to the predicted number of revolutions of the output shaft 5 of the clutch 10 at the time when the number of revolutions of the engine 1 has been controlled by the fuel-air mixture controller 20 and the new meshing engagement of the gears has been established. The signal corresponding to the predicted number of revolutions of the output shaft 5 of the clutch 10 appears on the lead 312, and a gear meshing signal indicating that the new meshing engagement of the gears has been established appear on one of the leads 347 and 349.

Figure 6:
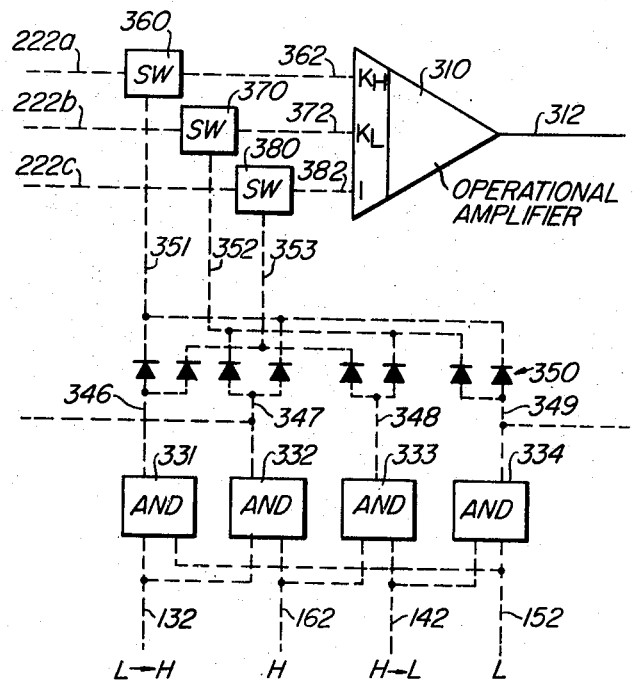
FIG. 6 is a block diagram of a predictive computer circuit in the computing circuit shown in FIG. 5 for predicting the number of revolutions of the output shaft of the clutch.

In the case of a two-forward speed transmission, the predictive computer circuit 300 has a structure as shown in FIG. 6. The output signals from the amplifier 220 are supplied by the leads 22a, 222b and 222c to switching circuits 360, 370 and 380, respectively. The output signals from these switching circuits 360, 370 and 380 are supplied to an operational amplifier 310 through leads 362, 372 and 382, respectively. Switching signals are applied to the switching circuits 360, 370 and 380 through the respective leads 351, 352 and 353. The output signal from the operational amplifier 310 appears on the lead 312. The leads 351, 352 and 353 are connected through a diode logic circuit 350 to leads 346, 347, 349; leads 347, 348, 349; and leads 346, 348, respectively. Output signals from AND-circuits 331, 332, 333 and 334 are supplied to the respective leads 346, 347, 348 and 349. These AND-circuits 331, 332, 333 and 334 are similar to the AND-circuits 610, 620 and 630 previously described. The low-to-high shift signal L → H for shifting from low to high gear and the low gear position signal L are applied to the AND-circuit 331 through the respective leads 132 and 152. The low-to-high shift signal L → H for shifting from low to high gear and the high gear position signal H are applied to the AND-circuit 332 through the respective leads 132 and 162. The high-to-low shift signal H → L for shifting from high to low gear and the high gear position signal H are applied to the AND-circuit 333 through the respective leads 142 and 162. The high-to-low shift signal H → L for shifting from high to low gear and the low gear position signal L are applied to the AND-circuit 334 through the respective leads 142 and 152.

Figure 7:
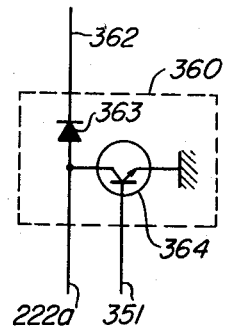
FIG. 7 is a connection diagram of a switching circuit employed in the predictive computer circuit shown in FIG. 6.

The operational amplifier 310 is one having a resistance feedback as employed in an analog computer so that any desired amplification factor can be obtained by suitably selecting the value of input resistors. Herein, the leads 362, 372 and 382 are connected to terminals having respective amplification factors of $K_H$, $K_L$, and 1. $K_H$ represents the gear ratio of low gear to high gear and has, for example, a value of 1.8, while $K_L$ represents the gear ratio of high gear to low gear and has, for example, a value of 1/1.8. The switching circuits 360, 370 and 380 have entirely the same structure. As shown in FIG. 7, the switching circuit 360 includes a transistor 364 and a diode 363. The collector of the transistor 364 is connected to the anode of the diode 363. The output signal from the amplifier 220 is applied by the lead 222a and the switching signal from the AND-circuit 331 is applied to the base of the transistor 364 by the lead 351. The transistor 364 has its emitter grounded. When the switching signal is applied to the base of the transistor 364 by the lead 351, the transistor 364 conducts so that the output signal from the amplifier 220 applied by the lead 222a is grounded and does not appear on the lead 362 leading out from the cathode of the diode 363. Thus, the switching circuit 360 is turned off.

Figure 16:
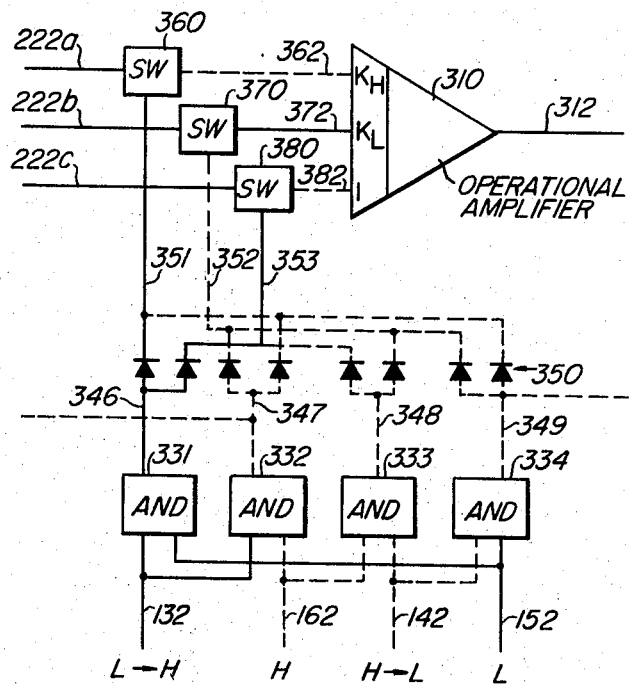
FIG. 16 is a flow chart showing the operation of the predictive computer circuit shown in FIG. 6 while the transmission is still in the low gear position during a shift from low to high gear.
Figure 17:
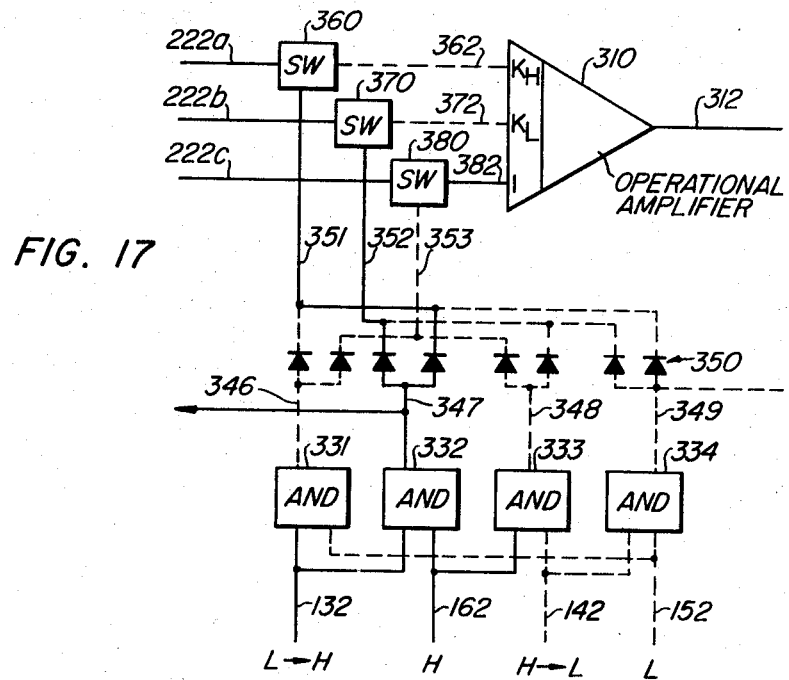
FIG. 17 is a flow chart showing the operation of the predictive computer circuit shown in FIG. 6 when the transmission is moved to the high gear position during the shift from low to high gear.

In FIG. 16, there is shown the operation of the predictive computer circuit 300 when the gear position is shifted from low to high gear. The low-to-high shift signal L → H appears on the lead 132, and the low gear position signal L appears on the lead 152 since the transmission is still in the low gear position. When both these signals appear the AND-circuit 331 solely generates its output signal which is applied to the switching circuits 360 and 380 to turn off the same so that the signals having appeared on the leads 362 and 382 now disappear, and the signal appearing on the lead 222b is solely allowed to be applied to the operational amplifier 310 by the lead 372. Therefore, a signal which is $K_L$ or 1/1.8 times the signal representative of the number of revolutions of the clutch output shaft 5 is delivered from the operational amplifier 310 to appear on the lead 312. In FIG. 17, there is shown the operation of the predictive computer circuit 300 in the case where the high gear position is established during the shift from low to high gear. As a result of the shift in the meshing engagement of the gears from low to high gear, a signal appears on the lead 347 from the AND-circuit 332 and the signal appearing on the lead 222c is solely allowed to be applied to the operational amplifier 310 by the lead 382. Therefore, a signal which is entirely the same as the signal representative of the number of revolutions of the clutch output shaft 5 is delivered from the operational amplifier 310 to appear on the lead 312.

Figure 18:
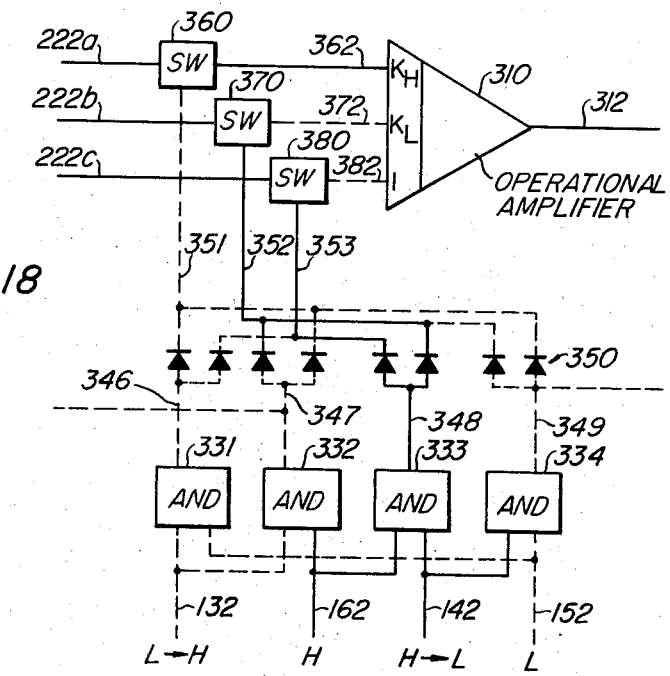
FIG. 18 is a flow chart showing the operation of the predictive computer circuit shown in FIG. 6 while the transmission is still in the high gear position during a shift from high to low gear.
Figure 19:
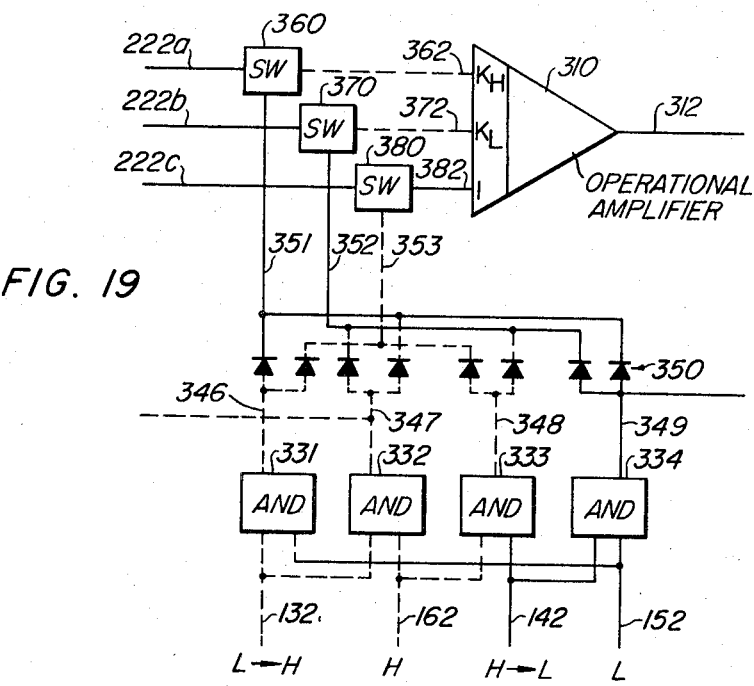
FIG. 19 is a flow chart showing the operation of the predictive computer circuit shown in FIG. 6 when the transmission is shifted to the low gear position during the shift from high to low gear.

When, as shown in FIG. 18, both the high-to-low shift signal H → L and the high gear position signal H exist, a signal appears on the lead 348 from the AND-circuit 333 and the signal appearing on the lead 222a is solely allowed to be applied to the operational amplifier 310 by the lead 362. Therefore, a signal which is $K_H$ (for example, 1.8) times the signal representative of the number of revolutions of the clutch output shaft 5 is delivered from the operational amplifier 310 to appear on the lead 312. In FIG. 19, there is shown the operation of the predictive computer circuit 300 in the case in which the low gear position is established during the shift from high to low gear. As a result of the shift in the meshing engagement of the gears from high to low gear, a signal appears on the lead 349 from the AND-circuit 334 and the signal appearing on the lead 222c is solely allowed to be applied to the operational amplifier 310 by the lead 382. Therefore, a signal which is entirely the same as the signal representative of the number of revolutions of the clutch output shaft 5 is delivered from the operational amplifier 310 to appear on the lead 312.

The operation of the computing circuit shown in FIG. 5 during a shift from low to high gear will be described with reference to FIGS. 8 to 11.

Figure 8:
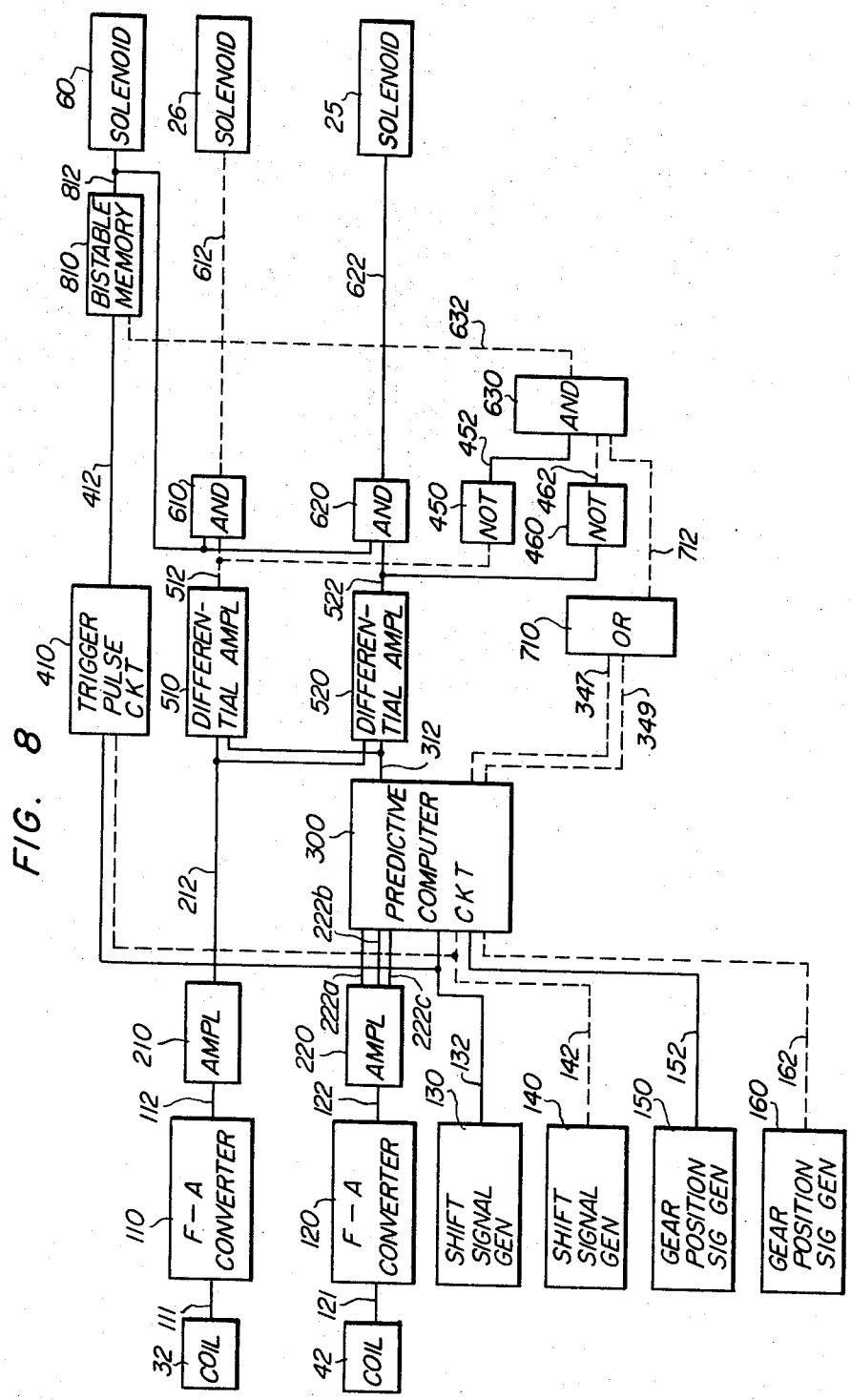
FIG. 8 is a flow chart showing the operation of the computing circuit shown in FIG. 5 which applies until the clutch is disengaged in response to a shift from low to high gear.

FIG. 8 shows how the clutch 10 is disengaged in response to the low-to-high shift signal L → H generated from the shift signal generator 130 for carrying out a shift from low to high gear during running of the vehicle in low gear. The trigger pulse generator 410 generates a positive pulse signal which is applied to the bistable memory circuit 810 so that the bistable memory circuit 810 is urged to one of the stable states in which it produces an output signal. The output signal from the bistable memory circuit 810 energizes the clutch solenoid 60 to urge the clutch shoe 4 away from the clutch disc 3. Although the disengagement of the clutch 10 would not cause any abrupt variation in the vehicle speed, the load on the engine is abruptly removed and the engine starts to rotate at a greater number of revolutions since the accelerator pedal is kept depressed. Since, in this case, the transmission is still in the low gear position, the predictive computer circuit 300 predicts the high gear position and delivers to the lead 312 a signal which is $K_L$ or 1/1.8 times the signal representative of the number of revolutions of the output shaft 5 of the clutch 10. The predicted r.p.m. signal and the r.p.m. signal delivered from the amplifier 210 representative of the number of revolutions of the input shaft 2 of the clutch 10 are compared with each other in the differential amplifiers 510 and 520. When, for example, the signal representative of the number of revolutions of the input shaft 2 is greater than the signal representative of the predicted number of revolutions of the output shaft 5, an output signal is delivered from the differential amplifier 520 to appear on the lead 522 to be applied to the AND-circuit 620. Since the output signal from the bistable memory circuit 810 is also applied to the AND-circuit 620 by the lead 812, an output signal appears from the AND-circuit 620 on the lead 622 so that the shutoff solenoid 25 is energized to reduce the number of revolutions of the engine 1. In the meantime, the pulse signal delivered from the trigger pulse generator 410 disappears. In a short while, the gear position is shifted to high gear.

Figure 9:
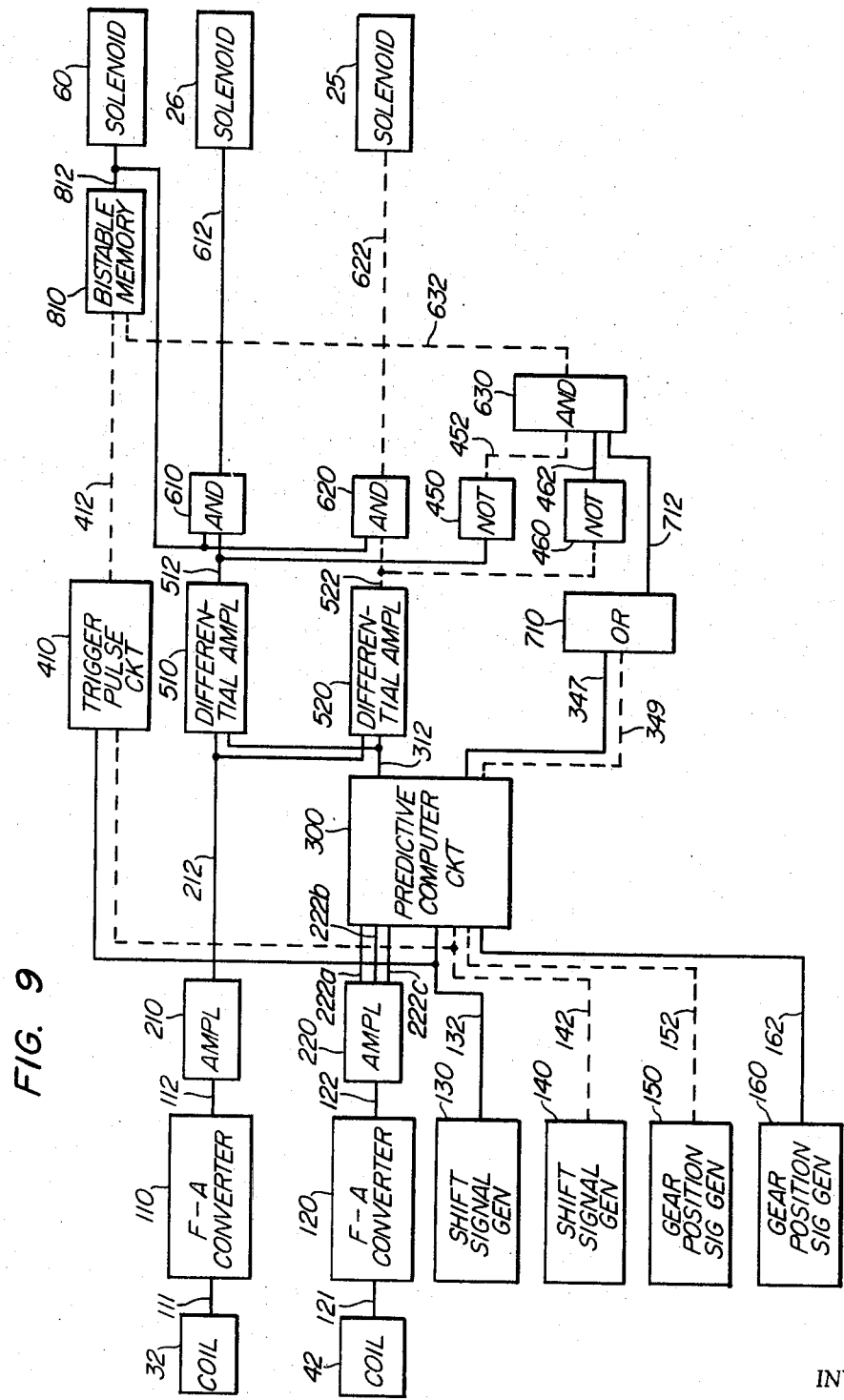
FIG. 9 is a flow chart showing the operation of the computing circuit shown in FIG. 5 until an opening solenoid is energized in response to the shift from low to high gear.

FIG. 9 shows how the opening solenoid 26 is energized as soon as the high gear position is established. The high gear position signal H is delivered from the high gear position signal generator 160 to appear on the lead 162 to be applied to the predictive computer circuit 300. In the predictive computer circuit 300, the switching operation shown in FIG. 17 takes place so that the signal representative of the number of revolutions of the output shaft 5 of the clutch 10 is transmitted therethrough in the ratio of 1:1 to be applied to the differential amplifiers 510 and 520, and at the same time, a gear meshing signal is delivered from the predictive computer circuit 300 to appear on the lead 347 to be applied to the OR-circuit 710. Therefore, an output signal is produced from the OR-circuit 710. When, during such an operation, the number of revolutions of the input shaft 2 of the clutch 10 becomes smaller than the number of revolutions of the output shaft 5 of the clutch 10, an output signal is delivered from the differential amplifier 510 to appear on the lead 512, while the output signal from the differential amplifier 520 disappears. Since the output signal from the bistable memory circuit 810 and the output signal from the differential amplifier 510 are applied to the AND-circuit 610 by the respective leads 812 and 512, the AND-circuit 610 produces an output signal which is applied by the lead 612 to the opening solenoid 26 to energize same thereby to increase the number of revolutions of the engine 1 until the number of revolutions of the engine 1 becomes substantially equal to the number of revolutions of the output shaft 5 of the clutch 10.

Figure 10:
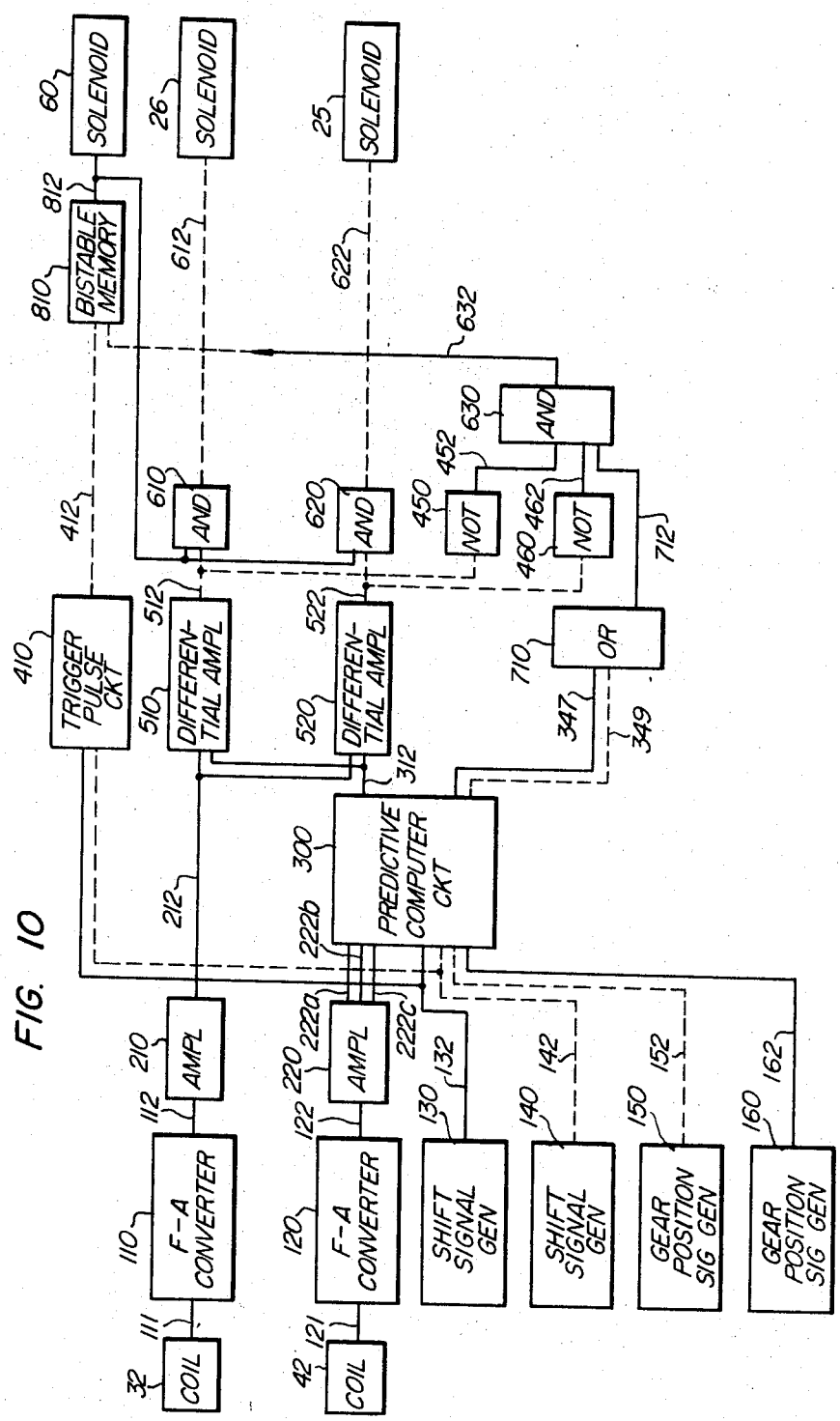
FIG. 10 is a flow chart showing the operation of the computing circuit shown in FIG. 5 until a clutch engaging signal is generated in response to the shift from low to high gear.

FIG. 10 shows how a clutch engaging signal is produced when the number of revolutions of the engine 1 becomes substantially equal to the number of revolutions of the output shaft 5 of the clutch 10 during the shift from low to high gear. As shown in FIG. 10, the output signals from the differential amplifiers 510 and 520 disappear, and output signals are produced from the NOT-circuits 450 and 460 to be applied to the AND-circuit 630 through the respective leads 452 and 462. Since the output signal from the OR-circuit 710 is also applied to the AND-circuit 630 through the lead 712, an output signal is delivered from the AND-circuit 630 to appear on the lead 632 to be applied to the bistable memory circuit 810.

Figure 11:
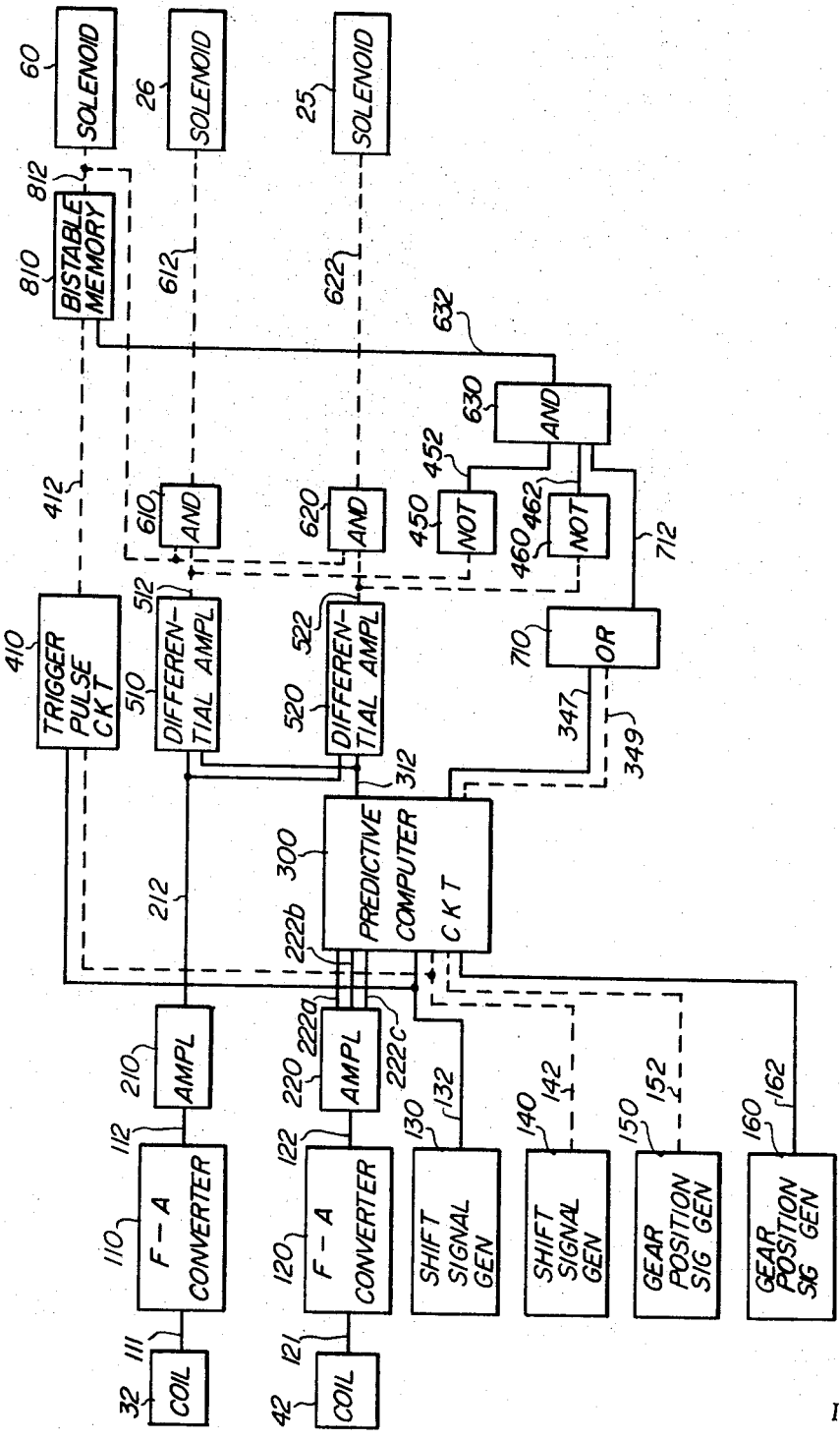
FIG. 11 is a flow chart showing the operation of the computing circuit shown in FIG. 5 until the engagement of the clutch is completed in response to the shift from low to high gear.

Therefore, referring to FIG. 11 which shows how the engagement of the clutch 10 is completed during the shift from low to high gear, the bistable memory circuit 810 is urged to the other stable state in which no output signal is delivered therefrom. That is to say, the output signal having appeared from the bistable memory circuit 810 disappears resulting in the deenergization of the clutch solenoid 60 so that the clutch disc 3 and the clutch shoe 4 are quickly engaged with each other. In this case, the number of revolutions of the input shaft 2 of the clutch 10 is substantially equal to the number of revolutions of the output shaft 5 of the clutch 10, and no torque variation occurs in the clutch 10. Further, both the opening solenoid 26 and the shutoff solenoid 25 are in the deenergized state and the throttle valve 22 is kept in a state entirely the same as that which existed before the shift in the gear position took place. Therefore, the driver does not feel any variation in the vehicle's speed during the shifting operation and can freely carry out subsequent acceleration and deceleration. It will be seen further that the above operation can be carried out stably and accurately by virtue of the fact that the logic circuits including the AND-circuits 610, 620 and 630 and the OR-circuit 710 are employed to control the clutch solenoid 60, opening solenoid 26 and shutoff solenoid 25.

The operation of the computing circuit shown in FIG. 5 during a shift from high to low gear will be described with reference to FIGS. 12 to 15.

Figure 12:
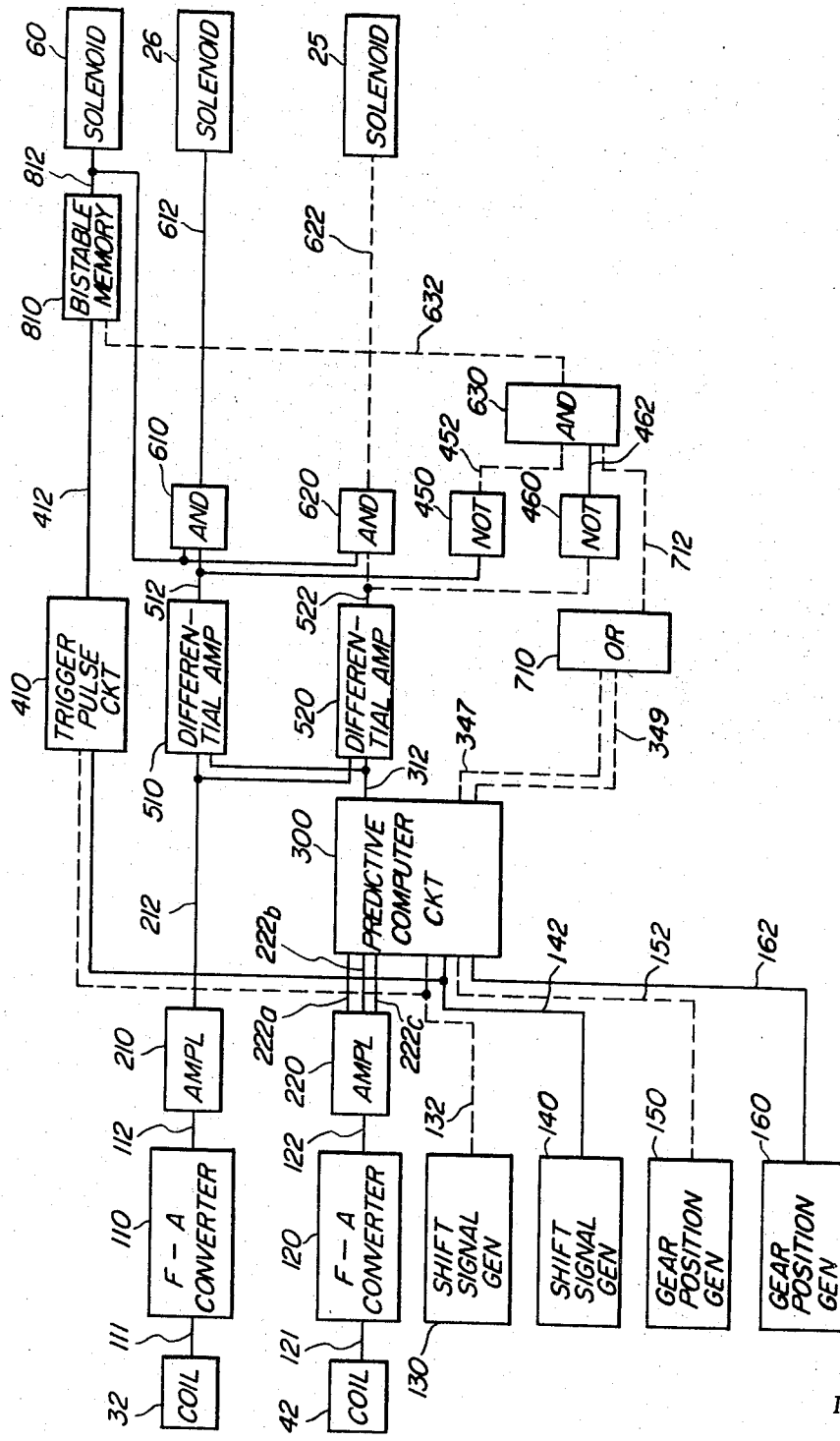
FIG. 12 is a flow chart showing the operation of the computing circuit shown in FIG. 5 until the clutch is disengaged in response to a shift from high to low gear.

FIG. 12 shows how the clutch is disengaged during the shift from high to low gear in response to a high-to-low shift signal H → L delivered from the shift signal generator 140 during running of the vehicle in the state shown in FIG. 11. The trigger pulse generator 410 generates a pulse signal which is applied to the bistable memory circuit 810 to urge the same to one of the stable states in which an output signal is produced to appear on the lead 812. The output signal from the bistable memory circuit 810 is applied by the lead 812 to the clutch solenoid 60 to energize same thereby to disengage the clutch 10. Accordingly, a difference appears between the number of revolutions of the input shaft 2 of the clutch 10 and that of the output shaft 5 of the clutch 10. When, for example, the vehicle is running under deceleration, the number of revolutions of the input shaft 2 of the clutch 10 is reduced abruptly, whereas any appreciable variation does not occur in the number of revolutions of the output shaft 5 of the clutch 10. A signal proportional to the number of revolutions of the output shaft 5 of the clutch 10 appears on the output leads 222a, 222b and 222c of the amplifier 220, and a signal representing the predicted number of revolutions of the output shaft 5 of the clutch 10 in the low gear position of the transmission 6 is delivered from the predictive computer circuit 300 to appear on the lead 312. That is to say, a signal obtained by multiplying the number of revolutions of the output shaft 5 by the shift ratio $K_H$ (for example, 1.8) appears on the output lead 312 of the predictive computer circuit 300. The difference between this signal and the signal representative of the number of revolutions of the input shaft 2 of the clutch 10 is computed in the differential amplifiers 510 and 520. In the present case, the signal appearing on the lead 312 is greater than the signal appearing on the lead 212, and therefore, an output signal is delivered from the differential amplifier 510 to appear on the lead 512 to be applied to the AND-circuit 610. An output signal is produced from the AND-circuit 610 to be applied to the opening solenoid 26 to energize same so that the number of revolutions of the engine 1 is increased.

Figure 13:
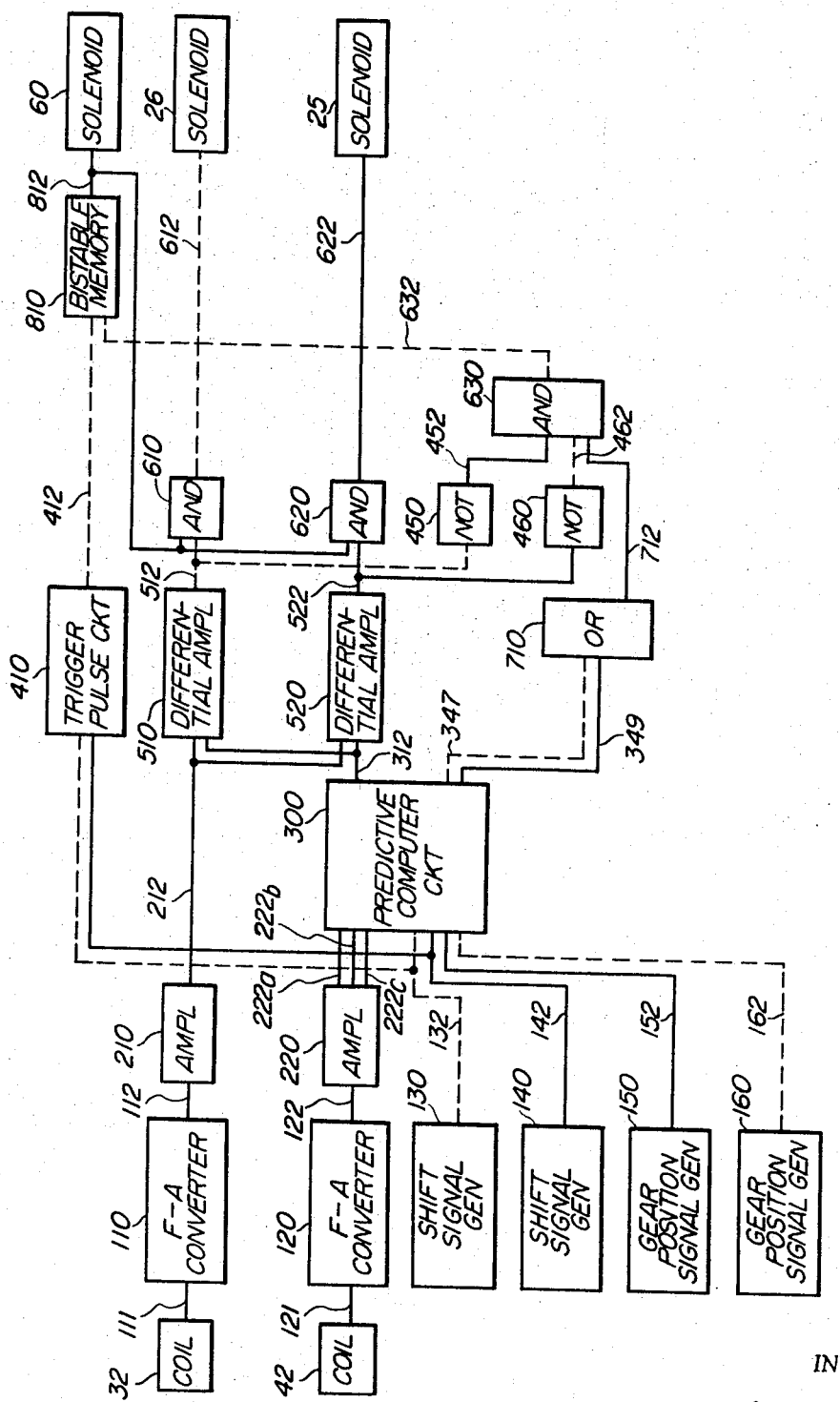
FIG. 13 is a flow chart showing the operation of the computing circuit shown in FIG. 5 until a shutoff solenoid is energized in response to the shift from high to low gear and the signal disappears after a period of time of $t$ seconds.
Figure 14:
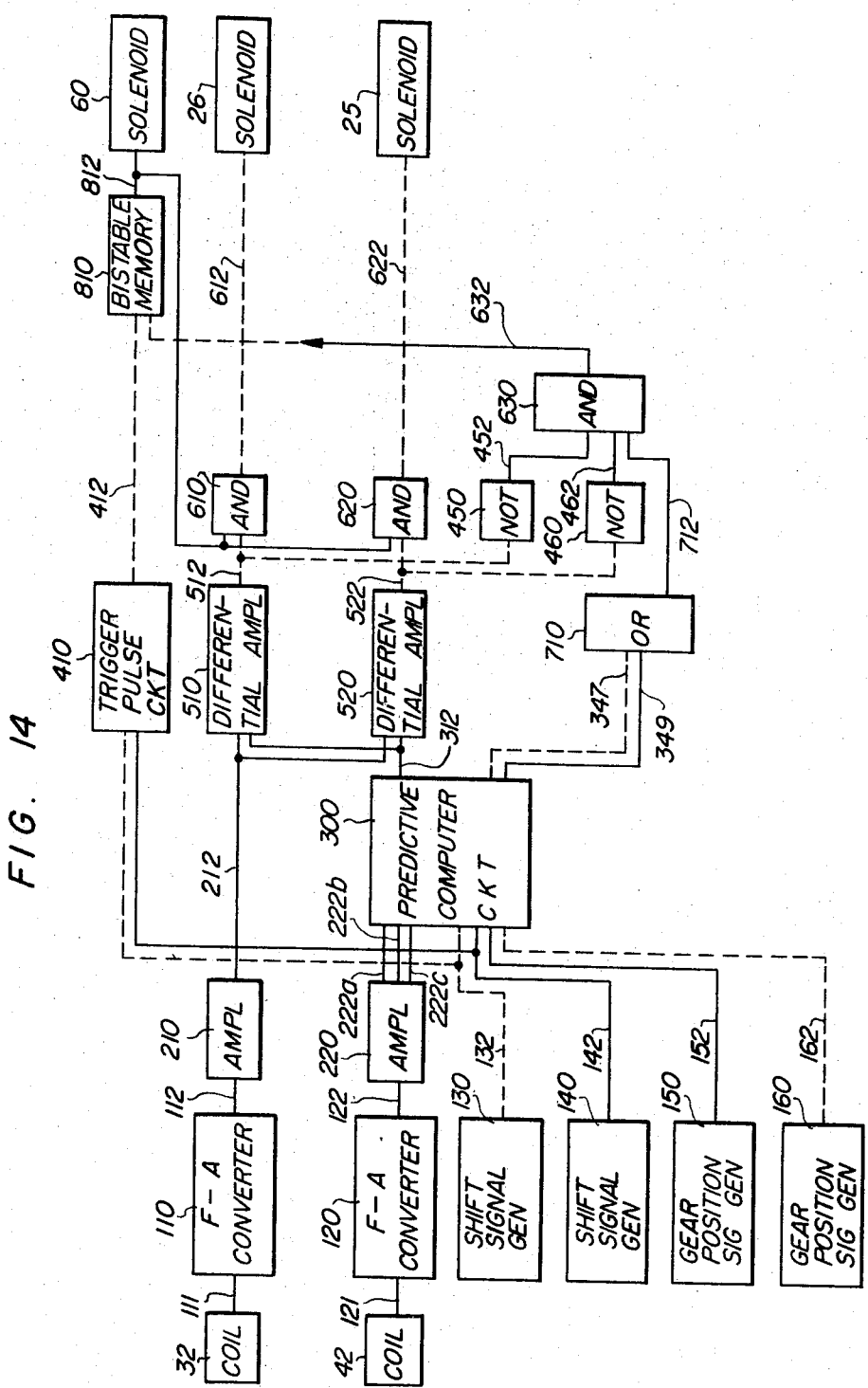
FIG. 14 is a flow chart showing the operation of the computing circuit shown in FIG. 5 until a clutch engaging signal is generated in response to the shift from high to low gear.

FIG. 13 shows how the shutoff solenoid 25 is energized during the shift from high to low gear and the energizing signal for the solenoid 25 disappears after $t$ seconds. When the low gear position is established in the transmission 6, the low gear position signal L is generated by the low gear position signal generator 150 to be applied to the predictive computer circuit 300 so that the output signal from the predictive computer circuit 300 has a 1:1 relation with the input signal applied thereto from the amplifier 220. The output signal from the predictive computer circuit 300 is compared in the differential amplifiers 510 and 520 with the r.p.m. signal representative of the number of revolutions of the input shaft 2 of the clutch 10 applied from the amplifier 210. When, for example, the r.p.m. signal representative of the number of revolutions of the clutch input shaft 2 is greater than the output signal from the predictive computer circuit 300, an output signal appears from the differential amplifier 520 to be applied to the AND-circuit 620. An output signal appears from the AND-circuit 620 to be applied to the shutoff solenoid 25 to energize same so that the number of revolutions of the engine 1 is reduced. At the same time, a low gear meshing signal appears from the predictive computer circuit 300 on the lead 349 to be applied to the OR-circuit 710. An output signal appears from the OR-circuit 710 to be applied to the AND-circuit 630. When the number of revolutions of the input shaft 2 of the clutch 10 becomes substantially equal to the number of revolutions of the output shaft 5 of the clutch 10, the output signals from the differential amplifiers 510 and 520 disappear, and an output signal appears from the AND-circuit 630 to be applied to the bistable memory circuit 810 by the lead 631 as shown in FIG. 14.

Figure 15:
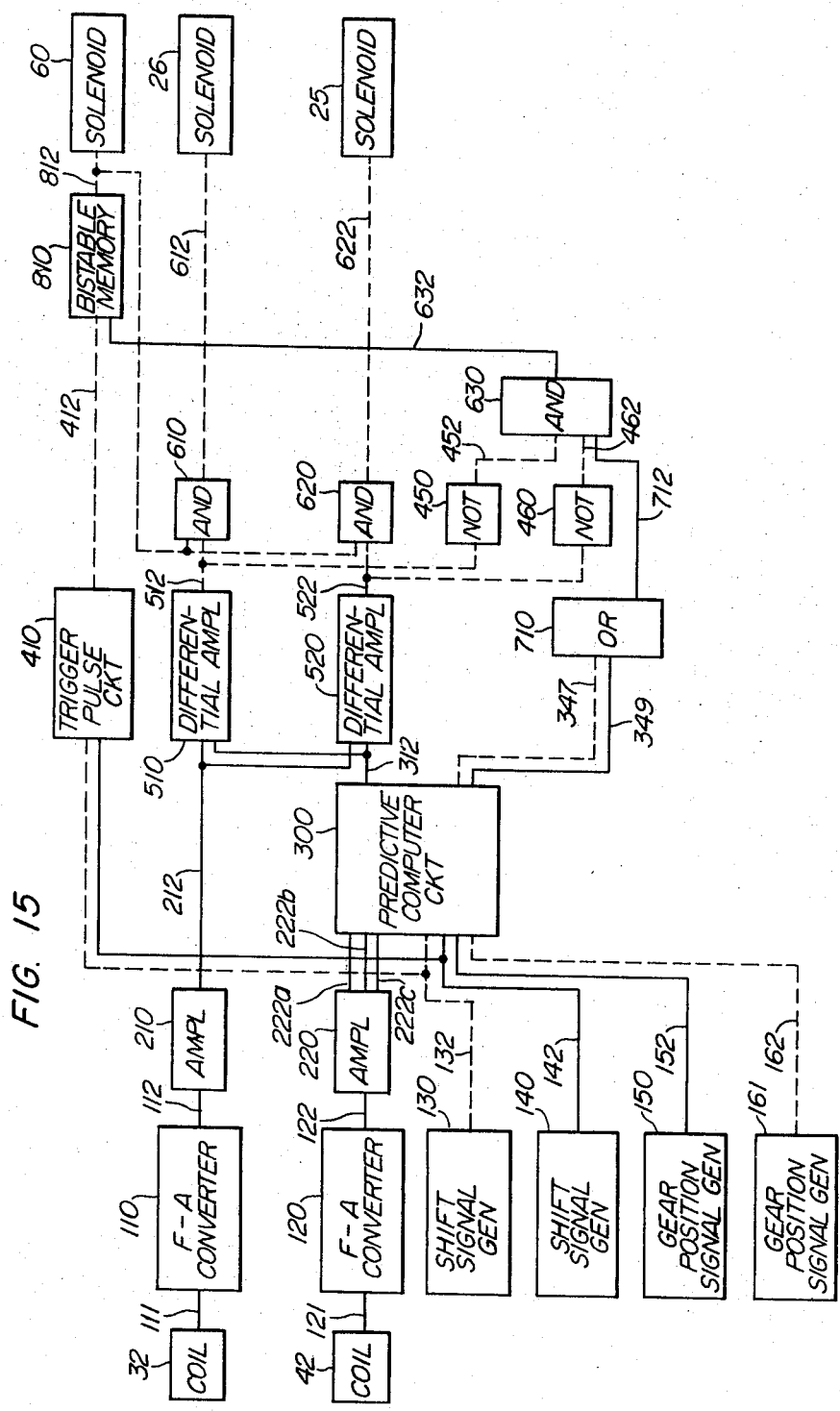
FIG. 15 is a flow chart showing the operation of the computing circuit shown in FIG. 5 until the engagement of the clutch is completed in response to the shift from high to low gear.

FIG. 15 shows how the engagement of the clutch 10 is completed during the shift from high to low gear. The bistable memory circuit 810 is urged to the other stable state in which no output signal is delivered therefrom due to the fact that the output signal from the AND-circuit 630 is applied thereto. Therefore, the output signal having appeared from the bistable memory circuit 810 disappears and the clutch solenoid 60 is deenergized to engage the clutch 10. Since, in this case, no output signals are delivered from the AND-circuits 610 and 620, the opening solenoid 26 and the shutoff solenoid 25 are in the original state in which they existed before the shift from high to low gear took place. Thus, at the time of the engagement of the clutch 10, the input and output shafts 2 and 5 of the clutch 10 rotate at substantially the same number of revolutions, and the throttle valve 22 is kept in the same state as that existed before the shift from high to low gear took place, thus making it possible to carry out the shift without any variation in torque. Further, the clutch can be engaged in a short period of time allowing for a quick shift because, as soon as the shifting operation is started, the number of revolutions of the engine 1 at the time of the engagement of the clutch 10 is predicted to control the number of revolutions of the engine 1.

Figure 20:
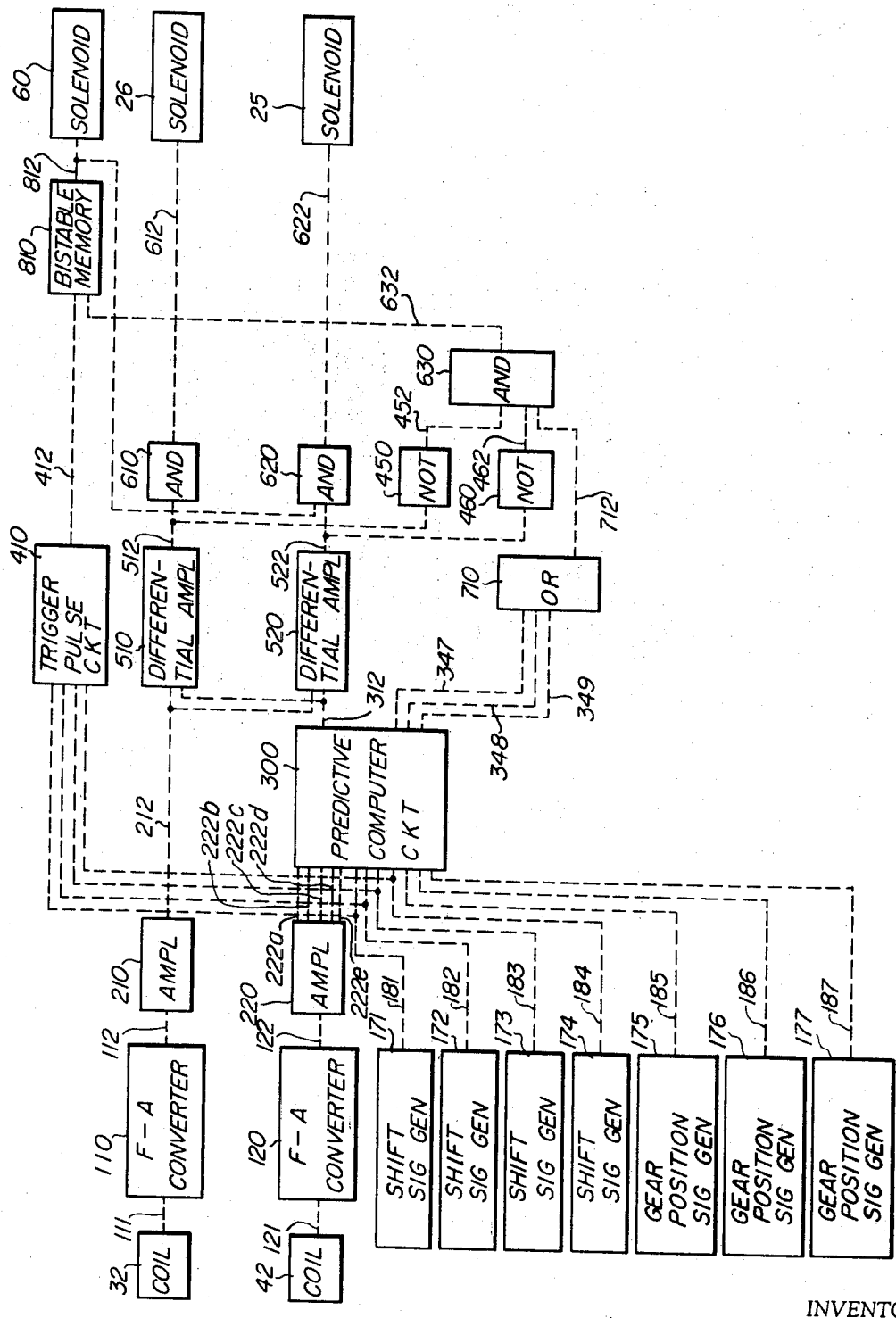
FIG. 20 is a block diagram of a computing circuit when the present invention is applied to a three-forward speed gear transmission.

Another embodiment of the present invention adapted for use with a three-speed gear transmission will be described with reference to FIGS. 20 and 21 in which like reference numerals are used to denote like parts appearing in FIGS. 5 and 6. FIG. 20 is a block diagram of a computing circuit used in this embodiment. Four shift signal generators 171, 172, 173 and 174 generate a first-to-second shift signal L → M, a second-to-third shift signal M → H, a third-to-second shift signal H → M, and a second-to-first shift signal, respectively. These shift signals are applied to a predictive computer circuit 300 through respective leads 181, 182, 183 and 184. Gear position signal generators 175, 176 and 177 generate a first gear position signal L, a second gear position signal M, and a third gear position signal H, respectively. These signals have a hysteresis as described with regard to the preceding embodiment. The gear position signals are applied to the predictive computer circuit 300 through respective leads 185, 186 and 187. FIG. 21 is a block diagram of the predictive computer circuit 300 for predicting the number of revolutions of the clutch output shaft. Input signals are applied to an operational amplifier 310 by leads 302, 322, 332, 342 and 382, and an output signal which is $\bar{K}_L$ times, $\bar{K}_H$ times, $K_L$ times, $K_H$ times or one time the respective input signals appears on a lead 312. The leads 302, 322, 332, 342 and 382 are connected to input leads 222a, 222b, 222c, 222d and 222e through switching circuits 310, 320, 330, 340 and 380, respectively. The symbols $\bar{K}_L$, $\bar{K}_H$, $K_H$ and $K_L$ designate the gear ratio of the transmission from second gear to first gear, from third gear to second gear, from second gear to third gear and from first gear to second gear, respectively. The switching circuits 310, 320, 330, 340 and 380 have a structure similar to that shown in FIG. 7, and switching signals are applied thereto through respective leads 354, 355, 356, 357 and 358. These leads 354, 355, 356, 357 and 358 are connected to a diode logic circuit 350 to which signals are applied from AND-circuits 371, 372, 373, 374, 375, 376 and 377. One of the input signals to the AND-circuit 376 is applied from an OR-circuit 378. By the use of the computing circuit shown in FIG. 20 and the predictive computer circuit 300 shown in FIG. 21, the disengagement and engagement of the clutch during a shift in the three-speed gear transmission can be satisfactorily controlled as in the case of the preceding embodiment adapted for a two-speed gear transmission.

The present invention is also applicable to an n-speed gear transmission. A clutch control system for use with such a transmission may include a predictive computer circuit comprising an operational amplifier having (2n−1) input terminals, (2n−1) switching circuits, (3n−2) AND circuits, a diode logic circuit having (2n−2) diodes connected to each of the output terminals of the AND circuits, and (n−2) OR circuits, n gear position signal generators and (2n−1) shift signal generators.

We claim:
1. A clutch control system for a vehicle having an engine which transmits power to a changeable gear transmission via a controlled clutch assembly, said control system comprising:
 a first speed detector means for detecting the number of revolutions per unit time of a mechanical input to said clutch assembly from said engine and for producing a first electrical signal related thereto,
 a second speed detector means effectively linked directly to an output shaft of said clutch assembly for directly detecting the number of revolutions per unit time of said output shaft and for producing a second electrical signal related thereto,
 a clutch actuating/deactuating means connected to said clutch assembly for actuating/deactuating said clutch assembly in response to clutch control signals applied thereto,
 air-fuel mixture controlling means connected to an intake of said engine for increasing or decreasing the speed of said engine and hence the speed of said mechanical input to said clutch assembly in response to engine speed control signals applied thereto,
 gear position signal generating means for supplying gear position signals indicative of the actual gear meshing conditions presently existing in said changeable gear transmission,
 shift signal generating means for supplying shift signals indicative of eminent changes soon to be effected in gear meshing conditions in said changeable gear transmission, and
 control means having inputs connected to outputs of said first and second speed detectors, of said gear position signal generating means and of said shift signal generating means and said control means having outputs connected to inputs of said clutch actuating/deactuating means and of said air-fuel mixture controlling means,
 said control means including a predictive computer means connected to said gear position signal generating means and to said shift signal generating means for utilizing said gear position signals and said shift signals in selectively processing said second electrical signal to produce a prediction signal representing the anticipated postshift clutch output speed before a gear shift has actually occurred and representing the actual clutch output speed after a gear shift has occurred,
 said control means further including comparison means connected to said air-fuel mixture controlling means, to said first speed detector and to an output of said predictive computer means for comparing said first electrical signal to said prediction signal and for generating said engine speed control signals in dependence upon the comparison therebetween whereby the engine speed and hence clutch input shaft speed is controlled to substantially match that of the clutch output during a shifting process
 said control means further including digital logic means connected to said clutch actuating/deactuating means, to said comparison means and to said shift signal generating means for generating said clutch control signals causing clutch deactuation in response to a change in said shift signals until a desired gear shift has occurred and said clutch input and output shaft speeds have a predetermined relationship.

2. A clutch control system as in claim 1 wherein said clutch actuating/deactuating means comprises an electromagnetic solenoid.

3. A clutch control system as in claim 1 wherein said air-fuel mixture controlling means comprises:
 a first solenoid operated means for increasing engine speed when activated, and
 a second solenoid operated means for decreasing engine speed when activated.

4. A clutch control system as in claim 3 wherein said first and second solenoid operated means comprise portions of a throttle linkage between an accelerator pedal and an engine intake value controlling the engine air-fuel mixture.

5. A clutch control system as in claim 3 wherein:
 said first solenoid operated means comprises a bypass value for bypassing an engine air-fuel mixture around a manually controlled throttle value in the engine intake manifold, and
 said second solenoid operated means comprises a further throttle value in said engine intake manifold.

6. A clutch control system as in claim 1 wherein said gear position signal generating means comprises electrical switch means mechanically coupled to a manually operated gear shift lever.

7. A clutch control system as in claim 1 wherein said shift signal generating means comprises electrical switch means mechanically coupled to a manually operated gear shift lever.

8. A clutch control system as in claim 1 wherein said predictive computer means comprises:
- signal dividing means connected to said second speed detector means for deriving and providing a plurality ($2n-1$) of output signals on a like plurality of output lines, each output signal being proportional to said second electrical signal where $n =$ the number of different possible gear meshing conditions
- amplifier means having a like plurality ($2n-1$) of inputs, each input having an effective gain related to a particular gear meshing condition,
- a like plurality ($2n-1$) of switching units each such unit being connected between a respectively corresponding one of the amplifier inputs and one of the signal dividing means output lines for selectively enabling a predetermined one of the output lines in response to predetermined digital logic signals applied thereto, and
- digital logic gating circuitry having inputs connected to receive said gear position signals and said shift signals and including means for generating said predetermined digital logic signals in response thereto whereby an output of said amplifier means comprises said prediction signal.

9. A clutch control system as in claim 1 wherein said comparison means comprises a differential amplifier together with logic circuitry to ensure actuation of said air-fuel mixture controlling means only when said clutch assembly is disengaged.

10. A clutch control system as in claim 1 wherein said digital logic means comprises:
- a trigger circuit connected to said shift signal generating means for generating a transient signal when shifting is eminent,
- a bistable means connected to be triggered to a first stable output state by said transient signal,
- an output of said bistable means being connected to a solenoid for disengaging said clutch assembly in response to said first stable output state,
- said bistable means being connected for triggering to a second stable output state corresponding to clutch engagement when a gear shift has been completed and the clutch input and output shaft speeds have said predetermined relationship.

* * * * *